United States Patent

Heilmeier et al.

[15] 3,650,603
[45] Mar. 21, 1972

[54] LIQUID CRYSTAL LIGHT VALVE CONTAINING A MIXTURE OF NEMATIC AND CHOLESTERIC MATERIALS IN WHICH THE LIGHT SCATTERING EFFECT IS REDUCED WHEN AN ELECTRIC FIELD IS APPLIED

[72] Inventors: George H. Heilmeier, Philadelphia, Pa.; Joel E. Goldmacher, Cranbury, N.J.

[73] Assignee: RCA Corporation

[22] Filed: Dec. 5, 1967

[21] Appl. No.: 688,123

[52] U.S. Cl............................................350/160, 252/408
[51] Int. Cl.........................................................G02f 1/16
[58] Field of Search..................350/150, 151, 160; 252/408; 260/465 E

[56] References Cited

UNITED STATES PATENTS 3,322,485  5/1967  Williams...............................350/160

OTHER PUBLICATIONS

Gray: Molecular Structure and the Properties of Liquid Crystals, Academic Press, London, 1962, p. 125

*Primary Examiner*—Ronald L. Wibert
*Assistant Examiner*—Edward S. Bauer
*Attorney*—Glenn H. Bruestle

[57] ABSTRACT

A liquid crystal light valve comprises a mixture of at least one nematic liquid crystal compound of the type that aligns in an electric field, with cholesterol, a cholestrol derivative of a cholesteric liquid crystal and means for applying an electric field to said mixture.

12 Claims, 3 Drawing Figures

Patented March 21, 1972
3,650,603
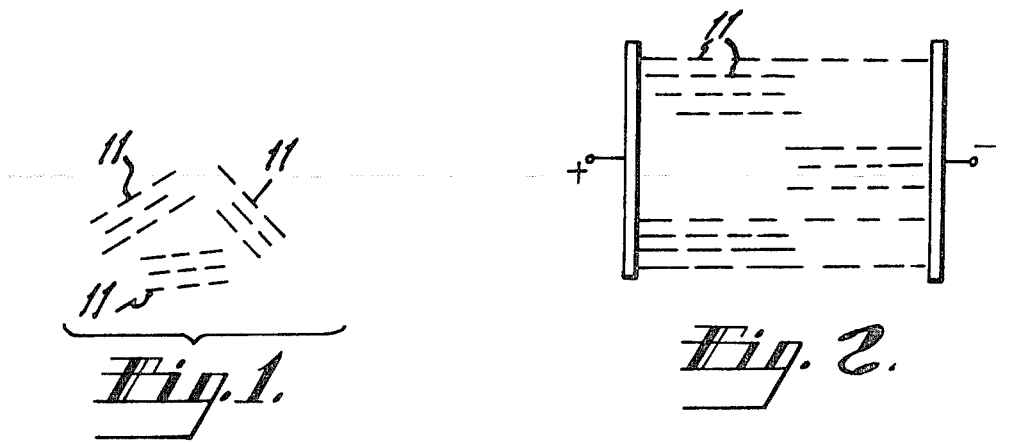
Fig. 1.
Fig. 2.
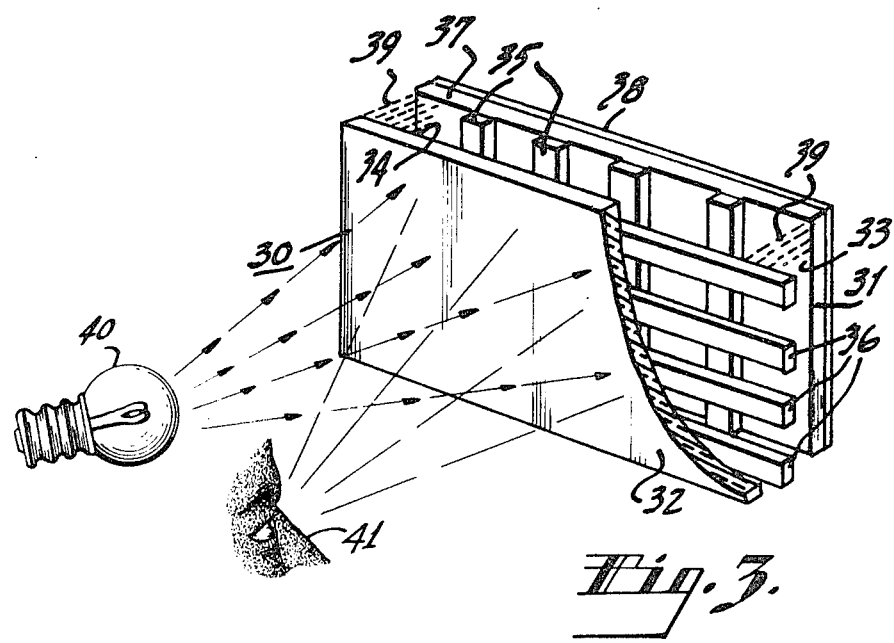
Fig. 3.
INVENTORS
George H. Heilmeier &
Joel E. Goldmacher
BY  [signature]
ATTORNEY

LIQUID CRYSTAL LIGHT VALVE CONTAINING A MIXTURE OF NEMATIC AND CHOLESTERIC MATERIALS IN WHICH THE LIGHT SCATTERING EFFECT IS REDUCED WHEN AN ELECTRIC FIELD IS APPLIED

BACKGROUND OF THE INVENTION

Nematic liquid crystal light valves and display devices and nematic liquid crystal compounds useful therein are described in U.S. Pat. No. 3,322,485 issued to Richard Williams. Such light valves are controlled by an electric field and operate when the liquid crystal material is in its mesomorphic state. Generally, with no electric field applied to the nematic liquid crystal material, the material is slightly turbid in appearance and scatters light to some extent. However, a thin layer of such a material is relatively transparent to light incident thereon. When an electric field above a threshold value, which value depends upon the particular liquid crystal composition, is applied to the layer of liquid crystal material, there is a change in appearance of the layer in the region of the applied field. The layer may appear either brighter or darker to a viewer observing light transmitted through the layer, depending upon the direction of alignment of the liquid crystal molecules in the field with respect to their molecular axes. If the liquid crystal molecules align essentially perpendicular to the direction of the incident light, then additional scattering occurs and that region of the device appears darker to a viewer on the side of the device opposite the source of incident light. If the liquid crystal molecules align with their molecular axes essentially parallel to the direction of the incident light, then there is less scattering of the incident light, and that region appears brighter to the viewer. The direction of alignment of the liquid crystal molecules (which in the absence of an electric field exist in randomly oriented domains), in an electric field depends upon the direction of the dipole moment of the molecule with respect to its molecular axis.

The electro-optical effect due to alignment of the nematic liquid crystal molecules in an electric field may be employed in transmissive, reflective or absorptive type flat panel displays, in light shutters, and in other applications.

Since the nematic liquid crystal composition of these devices must be operated while in its nematic mesomorphic state, it is therefore desirable to use compositions which have a lower crystal-nematic transition temperature than prior art compositions. It is also desirable to use compositions wherein the contrast ratio between an excited or aligned region of the composition and an unexcited or unaligned region of the composition is greater than that achieved in prior art devices.

SUMMARY OF THE INVENTION

An electro-optic light valve comprises a mixture comprised of a nematic liquid crystal composition of the type whose molecules align in an electric field with at least one member of the group consisting of cholesterol, a cholesterol derivative and a cholesteric liquid crystal. The light valve includes means for applying an electric field to this mixture.

BRIEF DESCRIPTION OF THE DRAWINGS

FIG. 1 is a schematic showing of a liquid crystal in its unexcited state;

FIG. 2 is a schematic showing of a liquid crystal in its excited state; and

FIG. 3 is a perspective partially cutaway view of an electro-optic device embodying the invention.

DETAILED DESCRIPTION OF THE INVENTION

In the absence of an electric field, a nematic liquid crystal composition of the preferred type described herein has its dipole moment essentially parallel to its molecular axis and is believed to have its molecules 11 arranged in small randomly oriented domains, as shown in FIG. 1, when in its mesomorphic state. Upon the application of a sufficiently high electric field to the liquid crystal composition, it is believed that the domains tend to align themselves as shown in FIG. 2, so that a substantial proportion of the domains and hence a substantial proportion of the liquid crystal molecules are aligned essentially parallel to the direction of the applied field. The degree of alignment is a function of the field strength.

In practice, the liquid crystal display includes two planar elements with a thin liquid crystal film between them. One of the elements is transparent while the other may be transparent, reflective or absorptive depending upon the desired mode of operation of the device. Row conductors and column conductors, which may be transparent conductors, may be applied to a surface of each of the planar elements by applying an electric field to selected areas of the liquid crystal film. All of this is discussed and shown in the Williams patent.

It has been found that by mixing cholesterol, and/or a cholesterol derivative, and/or a cholesteric liquid crystal with a nematic liquid crystal composition of the type whose molecules align in an electric field, one achieves a mixture which is highly light scattering. The mixture also results in depression of the crystal-nematic transition temperature of the nematic liquid crystals. When an electric field is applied to such a mixture, so as to align the nematic liquid crystal molecules of the mixture with their axes substantially parallel to the direction of the incident light, the mixture essentially no longer scatters the light as it would in its unexcited state and becomes transparent to the incident light. This discovery makes possible light valves and display devices having improved contrast ratios as compared to prior art liquid crystal devices of the type which depend upon alignment of nematic liquid crystal molecules in an electric field.

A preferred embodiment of a novel liquid crystal element is show in FIG. 3 in the form of a crossed grid reflective electro-optic display device 30. The novel device 30 consists of a back and a front transparent support plate 31 and 32, respectively. The support plates 31 and 32 are parallel and are separated by a distance of about ½ mil. On the inner surface 33 of the back plate 31 is an array of parallel spaced conductive back electrode strips 35. On the inner surface 34 of the front plate 32 is an array of parallel spaced transparent conductive front electrode strips 36. The front conductive strips 36 are perpendicular to the back conductive strips 35. The outer surface 37 of the back plate 31 is coated with a reflective material 38, such as aluminum.

In the novel device 30, the space between the front and back plates 31 and 32 is filled with a mixture 39 comprising 80 weight percent of a nematic liquid crystal composition and 20 weight percent of cholesterol derivatives. The nematic composition consists essentially of equal weights of p-n-ethoxybenzylidene-p′-aminobenzonitrile and p-n-butoxybenzylidene-p′-aminobenzonitrile. The cholesterol derivatives consist essentially of 23 weight percent of cholesteryl chloride and 77 weight percent of cholesteryl oleate. The mixture may be sealed in the device 30 by using epoxy cement around the edges of the device 30. The nematic composition by itself has a crystal-nematic transition temperature of about 41° C. However, this transition temperature is reduced to about room temperature when mixed with the cholesteryl compounds.

In operation, in its reflective mode, a light source 40 and an observer 41 are both on the same side of the device as the front support plate 32. With no field applied to the device 30, the device 30 appears uniformly bright to the observer 41. When a DC or AC field of, for example, about 10 volts is applied to any portion of the liquid crystal composition, that portion appears darker than the remainder of the device. Desired or specific portions of the device can be darkened by applying proper voltages to particular pairs of front and back electrode strips.

The novel device 30 can operate in a light transmitting mode when there is no reflective coating 39 on the back plate 31 and when the back electrode strips 35 are transparent. In this mode, an observer is on the side of the device opposite a light source, and will observe transmitted light rather than reflected light. In this mode of operation, the device appears brighter to the observer in the region of an applied electric field when the incident light is essentially parallel to the direction of the field. This effect is due to the reduction of scattered light upon the application of the electric field and the direct passage of the light to the observer.

As previously stated, the mixtures useful in the practice of this invention include a nematic liquid crystal portion and a portion comprised of either cholesterol, or at least one cholesterol derivative, or at least one cholesteric liquid crystal, or combinations of these materials. An example of nematic liquid crystal materials of the type in which the molecules align in the direction parallel to the direction of an applied electric field are the family of compounds which may be described as p-n-alkoxybenzylidene-p'-aminobenzonitriles. Mixtures of the compounds p-n-ethoxybenzylidene-p'-aminobenzonitrile, p-n-butoxybenzylidene-p'-aminobenzonitrile and p-n-octoxybenzylidene -p'-aminobenzonitrile have been found especially useful in combination with cholesterol, cholesterol derivatives or cholesteric liquid crystals. Mixtures of these compounds combine fast response times due to the large dipole moment of the nematic liquid crystal molecule and also provide reduced crystal-nematic transition temperatures. With the reduced transition temperatures achieved, devices can be operated at lower temperatures than prior art devices. Preferred weight percent ranges of the compounds comprising the nematic liquid crystal portion of the overall mixture are from 10 to 90 weight percent of p-n-ethoxybenzylidene-p'-aminobenzonitrile with 10 to 90 weight percent of p-n-butoxybenzylidene-p'-aminobenzonitrile or nematic liquid crystal compositions containing from 15 to 70 weight percent of each of the three compounds referred to above. The lowest crystal nematic transition temperatures have been found with mixtures comprised of equal weight of p-n-ethoxybenzylidene-p'-aminobenzonitrile and p-n-butoxybenzylidene-p'-aminobenzonitrile or mixtures comprised of equal weights of p-n-ethoxybenzylidene-p'-aminobenzonitrile, p-n-butoxybenzylidene-p'-aminobenitrile, and p-n-octoxybenzylidene-p'-aminobenzonitrile. The former composition has a crystal-nematic transition temperature of about 41° C., and the latter composition has a crystal-nematic transition temperature of about 50° C. Both these transition temperatures are depressed to even lower temperatures upon the addition of the cholesteric material to the nematic composition.

These nematic liquid crystal compounds can be prepared by the condensation of p-aminobenzonitrile with the appropriate p-alkoxybenzaldehyde in a refluxing benzene solution with benzenesulfonic acid as a catalyst and azeotropic removal of water. Purification of these compounds is generally accomplished by repeated crystallization from hexane solution to a constant nematic- isotropic transmission temperature.

Some examples of other classes of nematic liquid crystal compounds of the type which align in an electric field and which may be combined with cholesteric materials as described herein are: p-alkoxybenzylidene-p'-aminoacylphenones, such as p-butoxybenzylidene-p'-aminoacetophenone; p-alkylbenzoic acid dimers, such as p-butoxybenzoic acid dimer; normal or substituted benzylidene-p-aminoazobenzenes such as benzylidine-p-aminoazobenzene; 4,4''-alkoxynitro-p-terphenyls, such as 4-methoxy-4''-nitro-p-terphenyl; p-,p'-alkyldiphenylpyridazines, such as p-,p'-butyldiphenylpyridazine; p-alkylbezylidene-p-aminophenyl-alkoxy compounds, such as p-ethylbenzylidene-anisidine; and other compounds such as p,p'-dibenzal-benzidine and p-butylbenzylidene-p'-aminophenylbutyrate.

Any cholesterol derivative or cholesteric liquid crystal may be used in the novel mixtures. The table shown below lists some examples of cholesterol derivatives and cholesteric liquid crystals which are useful in the novel device, in combination with the nematic liquid crystal compositions as described above.

TABLE I

Cholesterol Derivatives and Cholesteric Liquid Crystals

Cholesteryl Oleate (Pract.)
Cholesteryl Palmitate
Cholesteryl Decanoate
Cholesteryl Laurate
Cholesteryl Propionate
Cholesteryl Heptafluorobutyrate
Cholesteryl 2-Furoate
Cholesteryl Cinnamate
Cholesteryl Cyclohexanecarboxylate
Cholesteryl Anisoate
Dicholesteryl Phthalate
Cholesteryl p-Nitrobenzoate
Cholesteryl p-Phenylazobenzoate
Cholesteryl 3,5-Dinitrobenzoate
Cholesteryl 2-(2-Ethoxyethosy)ethyl Carbonate
Cholesteryl 2-(2-Methoxyethosy)ethyl Carbonate
Cholesteryl Geranyl Carbonate
Cholesteryl Octadecyl Carbonate
Cholesteryl 2-Propyn-1-yl Carbonate
Cholesteryl 2-Methyl-2-propene-1-yl Carbonate
Allyl Cholesteryl Carbonate
Cholesteryl 2,2,2-Trifluoroethyl Carbonate
Cholesteryl Methyl Carbonate
Cholesteryl Cinnamyl Carbonate
Cholesteryl p-Menth-1-en-8-yl Carbonate
Cholesteryl Nitrate
Cholestanyl Propynyl Carbonate
3$\beta$-Chlorocholest-5-ene
Cholestryl Methanesulfonate
5 -Cholestan-3$\beta$-yl Chloroformate
Cholestryl Chloroformate
5$\alpha$-Cholestn-3$\beta$-ol
Cholesterol
Stigmasterol All of the tabulated compounds are commercially available from Eastman Kodak Corp. of Rochester New York.

It is preferred that the nematic liquid crystal portion of the overall mixture comprise at least 50 weight percent of the total mixture, and preferably from about 75 to 95 weight percent of the overall mixture. However, it is possible to use mixtures containing as little as 5 percent nematic liquid crystals and up to 95 percent of cholesteric material.

The novel mixtures can be prepared by placing the desired proportions of the pure compounds in a vial and heating these compounds until a uniform isotropic liquid solution is formed. Generally, heating to a temperature of about 100° C. is sufficient. This isotropic liquid is then allowed to cool slowly to room temperature. During cooling the mixture enters its mesomorphic state and, depending upon the particular mixture, may solidify. The novel mixtures can be incorporated into the device by, for example, placing some of the mixture in its mesomorphic state on one support plate and carefully placing the other support plate over the first so that the mixture spreads to form a uniform film between them. Another technique is to have the spaced supports separated by shims and/or sealed on three sides and injecting the mixture into the space with a syringe.

What is claimed is:

1. An electro-optic light scattering device comprising:
   a. a mixture comprising a nematic liquid crystal composition of the type whose molecules align in an electric field with at least one member of the group consisting of cholesterol, a cholesterol derivative, and a cholesteric liquid crystal, and
   b. electrode for applying an electric field to said mixture.

2. An electro-optic device comprising:
   a. spaced plates at least one of which is transparent to light, b. a mixture comprising at least one nematic liquid crystal compound of the type whose molecules align in an electric field in a direction essentially parallel to the direction of an electric field applied thereto, and at least one member of the group consisting of cholesterol, a cholesterol derivative, and a cholesteric liquid crystal, in the space between said supports, and c. electrode means for applying an electric field to said mixture to cause alignment of the nematic liquid crystal molecules.

3. An electro-optic light scattering device comprising:

a. a mixture comprising a liquid crystal composition comprising at least one member of the group consisting of cholesterol, a cholesterol derivative, and a cholesteric liquid crystal, and at least one nematic liquid crystal compound selected from the group consistng of p-n-ethoxybenzyldene-p'-amino-benzonitrile, p-n-butoxybenzylidene-p'-aminobenzonitrile, and p-n-octoxybenzylidene-p'-aminobenzonitile, and b. electrode means for applying an electric field to said mixture.

4. The device recited in claim 3 wherein said nematic liquid crystal portion of said mixture comprises between 10 and 90 weight percent of p-n-ethoxybenzylidene-p'-aminobenzonitrile, and p-n-butoxybenzylidene-p'-aminobenzonitrile.

5. The device recited in claim 4 wherein said nematic liquid crystal compound in said mixture comprises equal weights of p-n-ethoxybenzylidene-p'-aminobenzonitrile and p-n-butoxybenzylidene-p'aminobenzonitrile.

6. The device recited in claim 3 wherein said nematic liquid crystal portion of said mixture comprises between 15 and 75 weight percent of p-n-ethoxybenzylidene-p'-aminobenzonitrile, p-n-octoxybenzylidene-p'-aminobenzonitrile.

7. The device recited in claim 5 wherein said nematic liquid crystal compounds in said mixture comprises equal weights of p-n-ethoxybenzylidene-p'-aminobenzonitrile, p-n-butoxybenzylidene-p'-aminobenzonitrile, and p-n-octoxybenzylidene-p'-aminobenzonitrile.

8. The device recited in claim 3 wherein the mixture includes from 5 to 30 weight percent of the combination of cholesteryl oleate and cholesteryl chloride.

9. The device recited in claim 1 wherein the mixture consists of essentially from 5 to 95 weight percent of nematic liquid crystals and from 5 to 95 weight percent of cholesteric material.

10. The light valve recited in claim 1 wherein the nematic liquid crystal portion of the mixture comprises from about 75 to 95 weight percent of the mixture.

11. An electro-optic reflective display device comprising:

a. a transparent front support plate, b. a specularly reflective back support plate spaced from and parallel to said front support plate, c. a plurality of parallel transparent conductive strips on said front support plate, d. a plurality of parallel conductive strips on said back support plate running in a direction essentially perpendicular to said transparent conductive strips on said front support plate, and e. a mixture comprising at least one nematic liquid crystal compound of the type that aligns in an electric field with its molecules essentially parallel to the direction of the field, with at least one member of the group consisting of cholesterol, a cholesterol derivative and a cholesteric liquid crystal, said mixture filling the space between said support plates.

12. An electro-optic light scattering device comprising:

a. a mixture comprising a liquid crystal composition comprising at least one member of the group consisting of cholesterol, a cholesterol derivative, and a cholesteric liquid crystal, and at least one nematic liquid crystal compound chosen from the group known as p-n-alkoxybenzylidene-p'-aminobenzonitrile, wherein the nematic liquid crystal portion of said mixture comprises about 75 to 95 weight percent of said mixture, and b. electrode means for applying an electric field to said mixture.

* * * * *

UNITED STATES PATENT OFFICE
CERTIFICATE OF CORRECTION

Patent No. 3,650,603                    Dated March 21, 1972

Inventor(s) George H. Heilmeier, et al.

It is certified that error appears in the above-identified patent and that said Letters Patent are hereby corrected as shown below:

In the abstract, line 3, "of a" should read --or a--. Column 3, line 41, "aminobenitrile" should read --aminobenzonitrile--; line 54, "transmission" should read --transition--. Column 4, line 36, "5 -Cholestan" should read --5a-Cholestan--; line 73, after "electrode" insert --means--. Column 5, line 16, "p-n-ethox" should read --p-n-ethoxy--; line 17, "benzyldene" should read --benzylidene--; line 20, "aminobenzonitile" should read --aminobenzonitrile--; line 35, after "aminobenzonitrile", insert --p-n-butoxybenzylidene-p'-aminobenzonitrile, and--.

Signed and sealed this 25th day of July 1972.

(SEAL)
Attest:

EDWARD M. FLETCHER, JR.                 ROBERT GOTTSCHALK
Attesting Officer                       Commissioner of Patents